Patented May 16, 1939

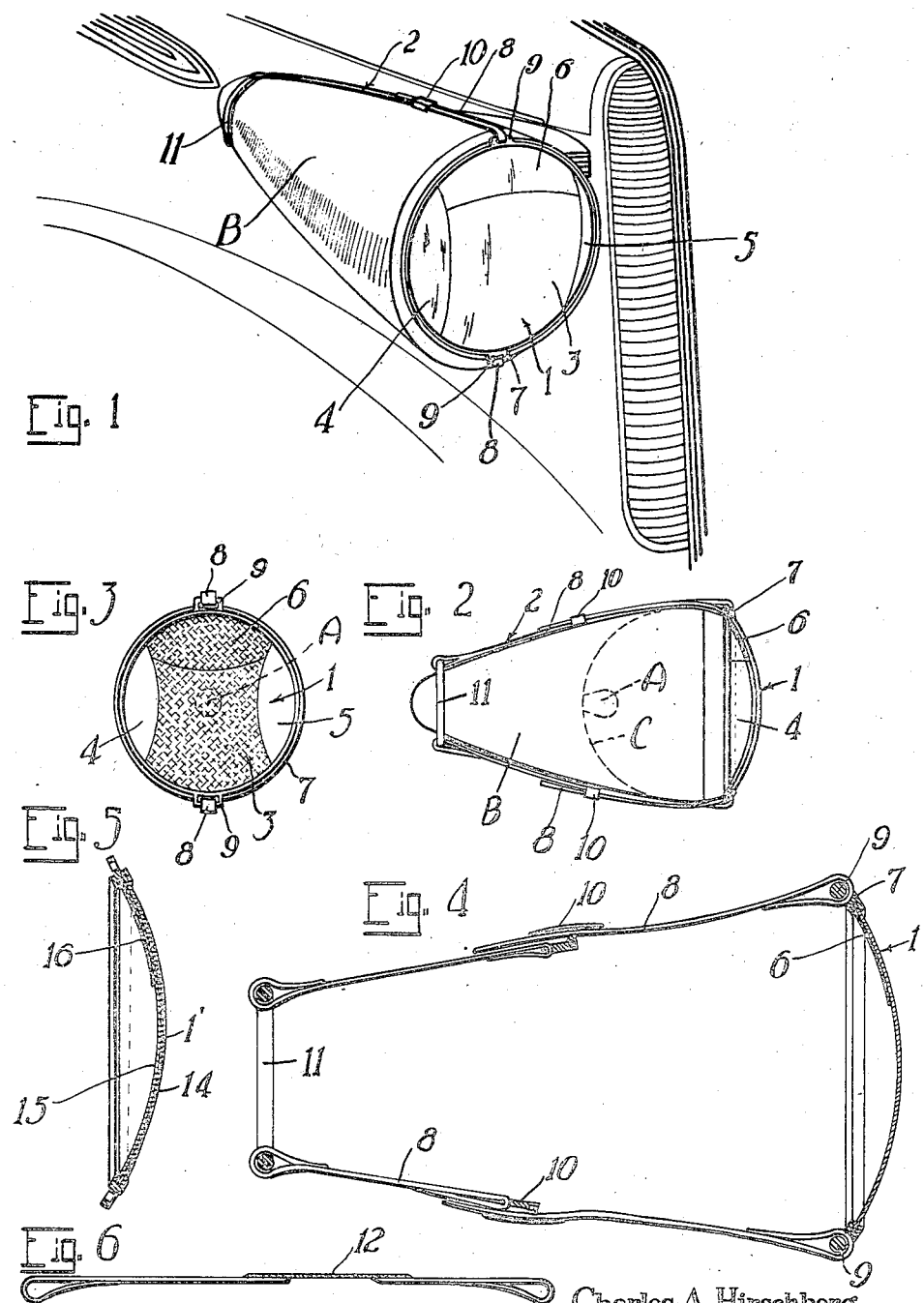

2,158,121

UNITED STATES PATENT OFFICE 2,158,121

AUXILIARY FOG LENS FOR AUTOMOBILES

Charles A. Hirschberg, Mountain Lakes, N. J.

Application February 5, 1937, Serial No. 124,212

1 Claim. (Cl. 240—48.4)

This invention relates to attachments for automobile headlights, and more particularly to fog lens which may be easily attached to or removed from the headlights of an automobile.

An object of the present invention is to provide auxiliary lens for use when driving in fog or heavy mists, which may be easily and quickly attached to the headlights of an automobile without requiring any changes or alterations to the headlights, and one which may be easily and quickly removed from the headlights after the emergency has passed, and stored in the storage compartment of the automobile, where it will always be convenient when needed.

Another object of the invention is to provide auxiliary lens as specified which are so constructed as to permit clear or uncolored light rays to project from the headlights at the side of the lens, while providing the colored light from the majority of the lens, also to provide on the lens means whereby the advantages of the high or touring adjustment of the headlights may be utilized without causing discomfort to approaching motorists by the normally high-thrown rays of such adjustment.

With these and other objects in view, as may appear from the accompanying specification, the invention consists of various features of construction and combination of parts, which will be first described in connection with the accompanying drawing, showing an auxiliary lens embodying the invention, and the features forming the invention will be specifically pointed out in the claim.

In the drawing:

Figure 1 is a perspective view showing the improved auxiliary fog lens attached to an automobile headlight.

Figure 2 is a side elevation of the improved auxiliary lens showing it applied to a headlight.

Figure 3 is a front view of the lens.

Figure 4 is a longitudinal section through the lens.

Figure 5 is a section through a modified form of the lens.

Figure 6 is a side elevation of a modified form of the attaching means for the lens.

Referring more particularly to the drawing, the improved auxiliary fog lens comprises the lens proper indicated by the numeral 1 and its attaching means 2. The lens proper comprises a sheet of Celluloid or other similar transparent material which is shaped to fit closely against the ordinary lens of an automobile headlight. The lens has its major portion colored as indicated at 3, which colored portion forms a band extending across the major portion of the lens, leaving clear edge portions 4 and 5 on each side of the colored major portion 3 of the lens. The colored major portion 3 is preferably colored yellow, orange, or any other suitable color which will color the light rays projected by the headlights. The inner side of the means 1 has an opaque coating indicated at 6 thereon, which is preferably sliver, aluminum or gold lacquer. This opaque portion 6 extends across the top of the colored portion 3 of the lens and acts as a light reflector for re-directing the high light rays from the bulb indicated at A of the headlight B back on the reflector C of the headlight for re-projection through the transparent part of the lens, thus eliminating the high undesirable rays which inconvenience approaching motorists but permit the utilizing of the advantages of the high or touring adjustment of the headlights.

A circular reinforcing band 7 is mounted over the edge of the lens 1 forming a reinforcement for the edge of the lens and providing means by which the attaching structure 2 is attached or connected to the lens 1.

The attaching structure shown in Figures 1 to 4 inclusive of the drawing comprises adjustable straps 8 which are connected to loops 9 formed on the reinforcing band 7. Buckles 10 are provided to permit adjustment of the straps and the ends of the straps remote from the lens 1 are attached to a ring 11. The ring 11 preferably is of soft rubber or other material which will not scratch or mar the enamel of the headlight, and which will snugly fit over the rear end of the headlight B. After the positioning of the lens 1 over the regular lens of the automobile headlight B and the placing of the ring 11 over the rear end of the headlight, the straps 8 may be adjusted to tightly hold the auxiliary fog lens over the regular lens of the headlight.

In Figure 6 of the drawing, a modified form of the attaching straps is shown. This modified form is similar to the straps 8 except that the buckles 10 are replaced by a length 12 of elastic material, so that the straps may be attached to place the ring 11 over the rear end of the headlight, and the elasticity of the section 12 will maintain the auxiliary lens tightly against the regular lens of the headlight.

The auxiliary lens 1 shown in Figures 1 to 4 inclusive of the drawing may be made of a single piece of Celluloid or other similar transparent material and have a portion thereof colored with the edge portions 4 and 5 left clear, or it may be made in any suitable manner such as by fusion of two or more pieces of Celluoid or similar material.

In Figure 5 of the drawing, a slight modification is shown, in which the lens 1' is shown as composed of a front sheet 14 and a rear sheet 15. The front sheet 14 may be clear with the back sheet 15 colored, or vice versa, as desired. The back sheet 15 may have the upper portion thereof coated with an opaque substance as indicated at 16, or not, as desired.

It will be understood that the invention is not to be limited to the specific construction or arrangement of parts shown but that they may be widely modified within the invention defined by the claim.

What is claimed is:

An auxiliary lens for automobile headlights comprising a concavo-convex lens of transparent material having its major surface extending diametrically of the lens in its normal vertical direction colored with the side portions of the lens on each side of the colored portion being clear, the upper transverse portion of the diametrical colored portion having a coating of light-reflecting material on its inner surface to render the coated portion opaque and light reflecting, said opaque portion being curved and presenting a concave surface towards a source of light rays to return the light rays in a direction towards the source of light.

CHARLES A. HIRSCHBERG.